(12) United States Patent
Glover et al.

(10) Patent No.: US 10,162,907 B2
(45) Date of Patent: *Dec. 25, 2018

(54) ORDERING ITEMS WITHIN A LIST COMPONENT OF AN APPLICATION CARD BASED ON BIAS PARAMETERS

(71) Applicant: Samsung Electronics Co., Ltd., Suwon-si, Gyeonggi-do (KR)

(72) Inventors: Eric Glover, Palo Alto, CA (US); Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

This patent is subject to a terminal disclaimer.

(21) Appl. No.: 14/984,538

(22) Filed: Dec. 30, 2015

(65) Prior Publication Data

US 2017/0192990 A1   Jul. 6, 2017

(51) Int. Cl.
*G06F 7/00* (2006.01)
*G06F 17/30* (2006.01)

(52) U.S. Cl.
CPC ...... *G06F 17/3097* (2013.01); *G06F 17/3053* (2013.01); *G06F 17/30528* (2013.01); *G06F 17/30864* (2013.01)

(58) Field of Classification Search
CPC .......... G06F 17/3097; G06F 17/30528; G06F 17/3053; G06F 17/30864
See application file for complete search history.

(56) References Cited

U.S. PATENT DOCUMENTS

| | | | |
|---|---|---|---|
| 7,295,995 B1 * | 11/2007 | York | G06Q 30/02 705/26.8 |
| 9,720,570 B2 * | 8/2017 | Wernick | G06F 3/0482 |
| 2015/0052121 A1 * | 2/2015 | Sharifi | G06Q 30/0631 707/723 |
| 2017/0169027 A1 * | 6/2017 | Ben-Tzur | G06F 17/3053 |
| 2017/0169030 A1 * | 6/2017 | Ben-Tzur | G06F 17/30867 |

* cited by examiner

*Primary Examiner* — Azam M Cheema
(74) *Attorney, Agent, or Firm* — Jefferson IP Law, LLP

(57) ABSTRACT

A card server that provides a card object to a mobile computing device in response to receiving a card request from the mobile computing device. The mobile computing device can utilize the card object to display an application card at the mobile computing device. The application card may include one or more list components. A list component may include multiple items. The card object may specify the items in the list component. Additionally, the card object may specify a display order for the items in the list component. The display order may indicate a sequence in which the items are to be rendered. The card server can determine the display order for the items based on user preferences associated with a user of the mobile computing device, and/or a search history of the user.

20 Claims, 5 Drawing Sheets

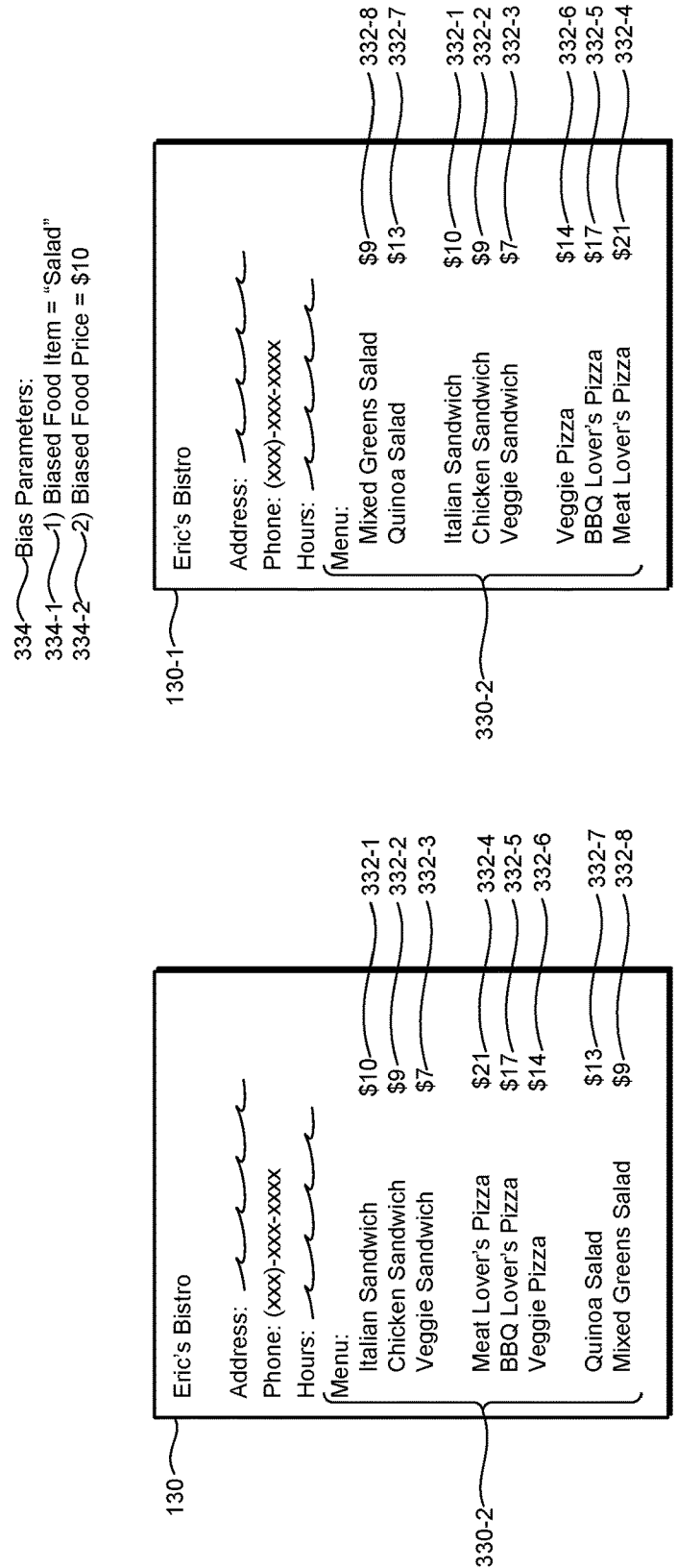

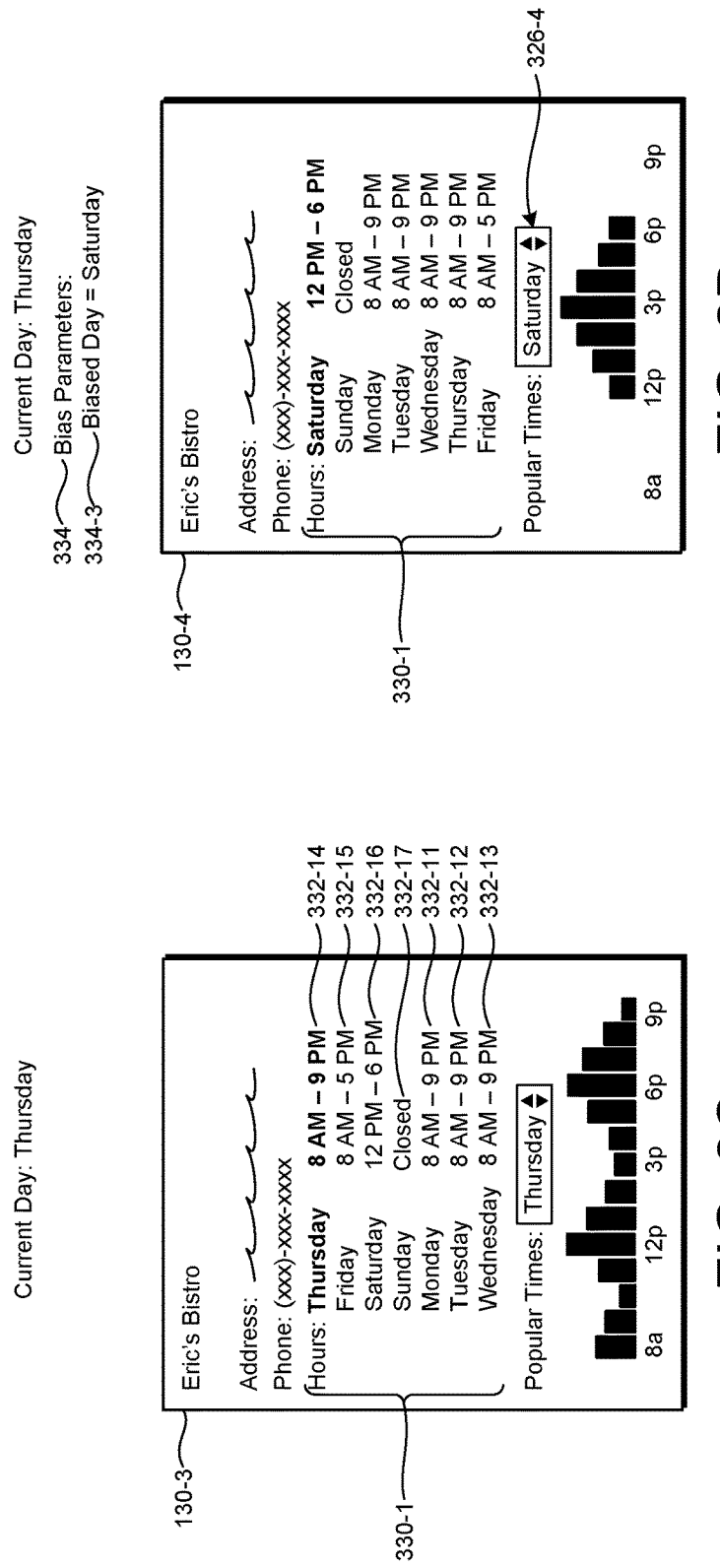

ORDERING ITEMS WITHIN A LIST COMPONENT OF AN APPLICATION CARD BASED ON BIAS PARAMETERS

TECHNICAL FIELD

This disclosure relates to ordering items within a list component of an application card based on bias parameters.

BACKGROUND

Many mobile computing devices can display a graphical user interface that allows a user of the mobile computing device to enter a search query. Upon receiving the search query from the user, the mobile computing device can transmit the search query to a search server. The search server can generate search results based on the search query. Upon generating the search results, the search server can send the search results to the mobile computing device. The mobile computing device receives the search results, and can display the search results on a display of the mobile computing device. Some mobile computing devices can display the search results in the form of a card. The card may include various components, and some components may include a list of various items. For example, a card that displays information regarding a restaurant may include a menu component that displays a list of food items on the menu.

SUMMARY

One aspect of the disclosure provides a card server. The card server may include a network communication device, a storage device, and a processing device. The storage device may store a user information data store, and a card data store. The user information data store may store user records. Each user record may store a user identifier (ID), user preferences, and a search history. The card data store may store card records. Each card record may include one or more list components. Each list component may include a plurality of items. At least one of the items may be associated with one or more bias parameters.

The processing device may execute computer-readable instructions that, when executed by the processing device, cause the processing device to receive a card request from a mobile computing device. The card request may include a search query with one or more search terms, and a user ID that identifies a user of the mobile computing device. The processing device may generate a consideration set of card records based on the search terms in the search query. The processing device can determine a relevance score for each card record in the consideration set. The processing device may select a card record from the consideration set based on the relevance scores for the card records in the consideration set. The processing device can identify a set of bias parameters associated with a list component of the selected card record.

The processing device may identify a user record, from the user information data store, that is associated with the card request. The processing device can determine a value for each bias parameter in the set of bias parameters based on the information stored in the user record associated with the card request. The processing device can determine a display order for the items in the list component based on the values for the set of bias parameters. The processing device can generate a card object that includes the items of the list component, and indicates the display order for the items. The processing device can transmit the card object to the mobile computing device.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A illustrates an application card that includes a list component for food items on a menu.

FIG. 2B illustrates an example display order for the food items shown in FIG. 2A based on a set of bias parameters.

FIG. 2C illustrates an application card that includes a list component for store hours.

FIG. 2D illustrates an example display order for the store hours shown in FIG. 2C based on a bias parameter.

Like reference symbols in the various drawings indicate like elements.

DETAILED DESCRIPTION

The present disclosure provides a system that may be used to render an application card at a mobile computing device based on a search query initiated by the mobile computing device. The application card may include various components. A component may refer to a graphical user interface (GUI) element that displays information. Some components may include a list of items. Such components may be referred to as list components. An item in a list component may include a text string, an image, a video, etc. The system may include a card server that receives card requests from various mobile computing devices. A card request may include a current search query. Upon receiving the current search query, the card server can identify a card record that can be used to render the application card. If the card record includes a list component with multiple items, then the card server can determine a display order for the items within the list component. The card server may determine a set of bias parameters, and determine the display order for the items based on the bias parameters.

Figure 1:
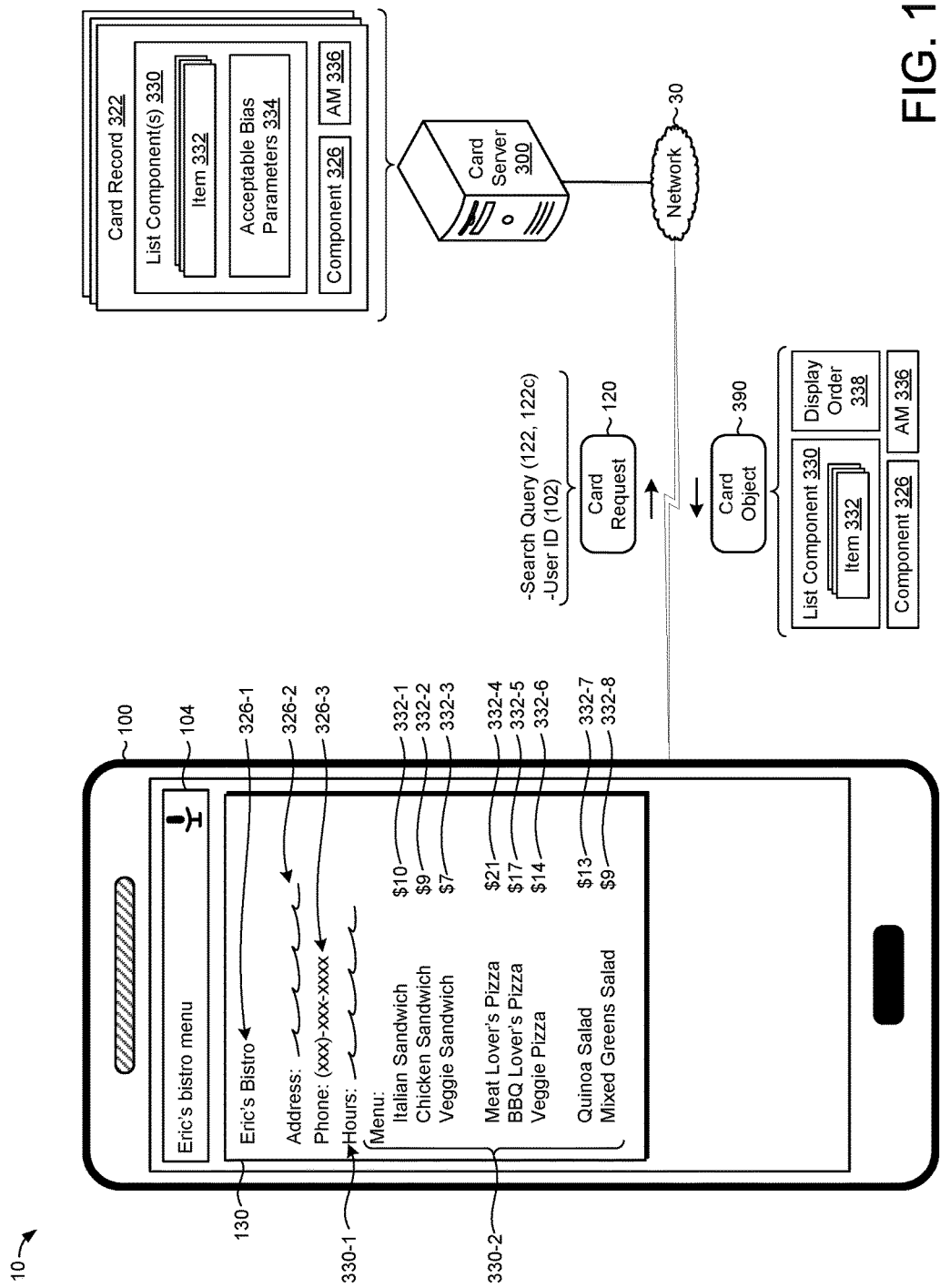
FIG. 1 is a schematic diagram of a system that orders items within a list component of an application card based on bias parameters.

FIG. 1 illustrates a schematic diagram of a system 10 that provides application cards 130 to a mobile computing device 100. The system 10 may include the mobile computing device 100, and a card server 300. The mobile computing device 100, and the card server 300 can communicate via a network 30. The network 30 may include a wireless network (e.g., a cellular network), or a wired network. In operation, the mobile computing device 100 can transmit (e.g., send) a card request 120 to the card server 300. The card request 120 can include a search query 122, and a user identifier (ID) 102 that identifies a user of the mobile computing device 100. The search query 122 in the card request 120 may be referred to as a current search query 122c. In response to transmitting the card request 120, the mobile computing device 100 receives a card object 390 from the card server 300. The card object 390 may include information that the mobile computing device 100 can utilize to render the application card 130.

The card server 300 may include a card data store (not shown) that stores various card records 322. A card record 322 may include information that the card server 300 and/or the mobile computing device 100 can utilize to render the application card 130. For example, a card record 322 may store information regarding a restaurant. A card record 322 may include one or more components 326, a list component 330, and an access mechanism 336. The component 326, and the list component 330 may include information that can be displayed via a graphical user interface (GUI) element. For example, a card record 322 for a restaurant may include a first component 326-1 for the restaurant name, a second component 326-2 for a restaurant address, a third component 326-3 for a restaurant phone number, etc.

The list component 330 may include a list of items 332. For example, a card record 322 for a restaurant may include a list component 330 for a menu. In this example, the items 332 may include food items that are on the menu. A list component 330 may be associated with a set of bias parameters 334. A bias parameter 334 may accept a value that the card server 300 can utilize to determine a display order 338 for the items 332 within the list component 330. The display order 338 may refer to an ordering, a sequence, or a display arrangement of the items 332. For example, the list component 330 for the menu may accept a food item as a bias parameter 334. In this example, the card server 300 can determine the display order 338 for the food items in the menu such that the food item specified as the bias parameter 334 appears at the top of the list. In some examples, the list component 330 for the menu may accept a maximum price as a bias parameter 334. In such examples, the card server 300 can order the food items in the menu such that food items that cost less than the maximum price, indicated by the bias parameter 334, are displayed above food items that cost more than the maximum price.

An item 332 may include a text string, an image, a video, and/or a link. An item 332 may be associated (e.g., tagged) with a bias parameter 334. The bias parameter 334 may be used to order, sort and/or filter the items 332. The list component 330 may include all the bias parameters 334 that the list component 330 accepts. In other words, the list component 330 may indicate all the bias parameters 334 that can be utilized to order the items 332 of the list component 330. If a particular bias parameter 334 is selected, then items 332 associated with that particular bias parameter 334 can be displayed above items 332 that are not associated with that particular bias parameter 334. A card record 322 can include multiple list components 322. For example, a card record 322 for a restaurant can include a first list component 330 for the menu, and a second list component 330 for the hours of the restaurant. The components 326 may be referred to as data fields. Similarly, the list components 330 may be referred to as multi-value data fields, and the items 332 may be referred to as values.

In the example of FIG. 1, the application card 130 is for Eric's Bistro—a fictional restaurant. In this example, the application card 130 includes a name component 326-1 that displays the restaurant name, an address component 326-2 that displays the restaurant address, and a phone number component 326-3 that displays the phone number. This example application card 130 also includes an hours list component 330-1 for the restaurant hours, and a menu list component 330-2 for the restaurant menu. The menu list component 330-2 lists various food items 332-1 . . . 332-8. The card server 300 determines a display order 338 for the food items 332-1 . . . 332-8 based the values for a set of bias parameters 334.

FIG. 2A. illustrates the same application card 130 shown in FIG. 1. In this application card 130, the food items 332-1 . . . 332-8 are displayed in accordance with a default display order. In other words, the food items 332-1 . . . 332-8 may be displayed in the order illustrated in FIG. 2A when the card server 300 does not utilize any bias parameters 334 to determine the display order 338. FIG. 2B illustrates an example application card 130-1 in which the display order 338 for the food items 332-1 . . . 332-8 in the menu list component 330-2 is based on a set of bias parameters 334. In this example, the bias parameters 334 include a biased food item 334-1, and a biased food price 334-2.

In the example of FIG. 2B, the food items 332-1 . . . 332-8 that are the same as, or similar to the biased food item 334-1 are displayed towards the top. For example, the mixed greens salad 332-8, and the quinoa salad 332-7 are displayed at the top because they are variants of the biased food item 334-1 (e.g., salad). In this example, the card server 300 utilizes the biased food price 334-2 to further order the food items 332-1 . . . 332-8. For example, the mixed greens salad 332-8 is displayed above the quinoa salad 332-7 because the mixed greens salad 332-8 is closer to the biased food price 334-2. As described herein, the card server 300 may determine the bias parameters 334 based on user preferences. The user preferences may include user-specified preferences, and/or preferences that the search server 300 has determined based on search history, browsing history, etc.

FIG. 2C illustrates another example application card 130-3 for Eric's Bistro. In this example, the application card 130-3 shows an expanded view of the hours list component 330-1. The hours list component 330-1 lists operating hours for each day of the week. For example, the hours list component 330-1 lists Monday hours 332-11, Tuesday hours 332-12 . . . Sunday hours 332-17. In the example of FIG. 2C, the Thursday hours 332-14 are displayed towards the top, for example, because the current day may be Thursday.

FIG. 2D illustrates another example application card 130-4 for Eric's Bistro. In this example, the card server 300 may utilize a bias parameter 334 to order the operating hours in the hours list component 330-1. The bias parameter 334 may be a biased day 334-3 (e.g., Saturday). As described herein, the card server 300 may determine the biased day 334-3 based on user preferences (e.g., user-specified preferences, or a previous search query). In the example of FIG. 2D, the Saturday hours 332-16 are displayed towards the top due to the biased day 334-3 being Saturday. The card server 300 may utilize the biased day 334-3 to parameterize a popular times component 326-4 that accepts a day of the week as a parameter. As such, the popular times component 326-4 may automatically display popular times for the biased day 334-3 (e.g., Saturday) instead of the current day (e.g., Thursday).

Figure 3:
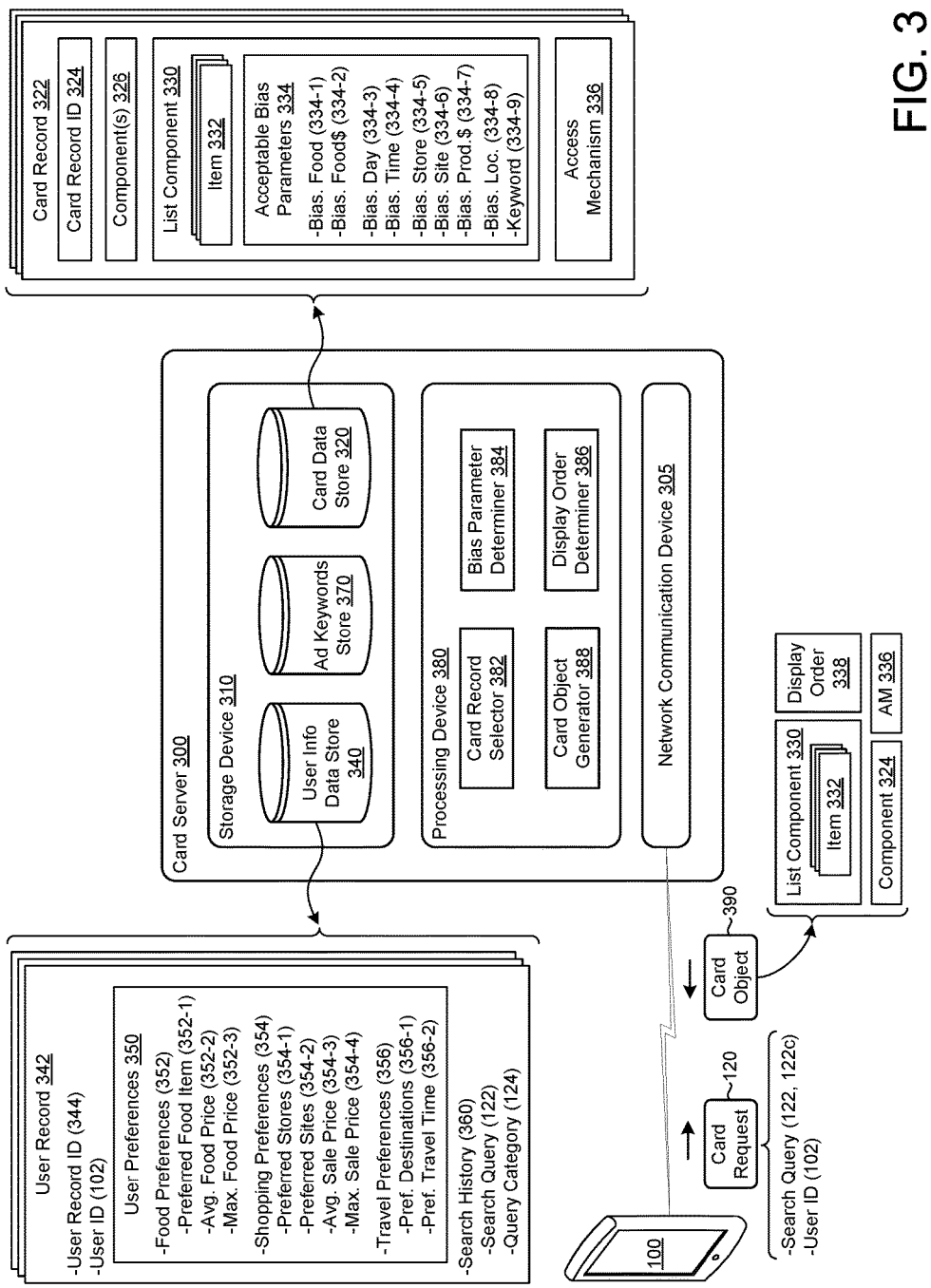
FIG. 3 is a block diagram of a card server that determines the display order for items within a list component of an application card based on bias parameters.

FIG. 3 illustrates an example block diagram for the card server 300. The card server 300 may include a network communication device 305, a storage device 310, and a processing device 380. The card server 300 may be implemented by a cloud computing platform. The cloud computing platform may include a collection of remote computing services. The cloud computing platform may include computing resources (e.g., the processing device 380). The computing resources may include physical servers that have physical central processing units (pCPUs). The cloud computing resources may include storage resources (e.g., the storage device 310). The storage resources may include database servers that support NoSQL, MySQL, Oracle, SQL Server, or the like. The cloud computing platform may include networking resources (e.g., the network communication device 305). Example cloud computing platforms include Amazon Web Services®, Google Cloud Platform®, Microsoft AZURE™ and Alibaba Aliyun™.

The network communication device 305 communicates with a network (e.g., the network 30 shown in FIG. 1). The network communication device 305 may include a communication interface that performs wired communication (e.g., via Ethernet, Universal Serial Bus (USB) or fiber-optic cables). The network communication device 305 may perform wireless communication (e.g., via Wi-Fi, Bluetooth, Bluetooth Low Energy (BLE), Near Field Communications (NFC), ZigBee, a cellular network, or satellites). The network communication device 305 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE), or LTE-Advanced). The transceiver may operate in accordance with a Universal Serial Bus (USB) specification (e.g., via a USB port).

The storage device 310 stores data. The storage device 310 may include one or more computer readable storage mediums. For example, the storage device 310 may include solid state memory devices, hard disk memory devices, optical disk drives, read-only memory, and/or nanotube-based storage devices. The storage device 310 may be connected to the processing device 380 via a bus, and/or a network. Different storage mediums within the storage device 310 may be located at the same physical location (e.g., in the same data center, same rack, or same housing). Different storage mediums of the storage device 310 may be distributed (e.g., in different data centers, different racks, or different housings). The storage device 310 may store a card data store 320, a user information data store 340, and an advertised (ad) keywords store 370.

The card data store 320 stores card records 322. The card records 322 store information that can be utilized to display the application cards 130 at the mobile computing device 100. Each card record 322 may include a card record ID 324. The card record ID 324 may include a string that identifies the card record 322. The card record 322 may include one or more components 326. A component 326 may store information that can be displayed in an application card 130. For example, a card record 322 for a restaurant may include a first component 326 that stores a restaurant name, a second component 326 that stores an address for the restaurant, a third component 326 for a phone number of the restaurant, etc. Generally, a component 326 may store a text string, an image, a video, etc. A component 326 may be referred to as a data field, and the information stored in the component 326 may be referred to as a value.

A card record 322 may include one or more list components 330. A list component 330 includes (e.g., stores) multiple items 332. An item 332 may include a text string, an image, a video, etc. For example, a card record 322 for a restaurant may include a list component 330 for the menu. In this example, the items 332 may include food items that are on the menu (e.g., as illustrated in FIGS. 1-2B). A list component 330 may be associated with one or more bias parameters 334. A bias parameter 334 may refer to a filter that can be utilized to order the items 332 in the list component 330. The bias parameters 334 can vary based on the items 332 that the list component 330 includes. For example, if the items 332 include food items on a menu, then the bias parameters 334 may include a biased food item 334-1, and/or a biased food price 334-2. If the items 332 include operating hours, then the bias parameter 334 may include a biased day 334-3, and/or a biased time 334-4. If the items 332 include products that are sold in various retail stores or on different websites, then the bias parameters 334 may include a biased store 334-5, a biased site 334-6, and/or biased product price 334-7. If the items 332 are associated with different locations, then a bias parameter 334 may include a biased location 334-8. In some examples, the list component 330 may accept a keyword 334-9 as a bias parameter 334. The bias parameters 334 associated with the list component 330 may be referred to as acceptable bias parameters.

The card records 322 may correspond with application states of various applications. For example, the card records 322 may correspond with application states of native applications that can be installed at mobile computing devices 100. The card records 322 may correspond with application states of web applications (e.g., with webpages of a website). The components 326, and the list components 330 may store information that the corresponding application state displays. For example, if a card record 322 corresponds with an application state that displays information regarding The Dark Knight movie, then the card record 322 may include components 326 for the movie title, the release year, etc. In this example, the card record 322 may include list components 330 for the actors in the movie, the ratings for the movie, the reviews for the movie, the image posters for the movie, etc. One of the items 332 in a list component 330 may have been designated as a default item 332. By default, the default item 332 may be given priority over the other items 332. For example, if a list component 330 includes image posters as items 332, then one of the posters may have been designated as the default poster. The default item 332 may be the most popular item, or the most trending item.

A card record 322 may store an access mechanism 336. The access mechanism 336 may be used to access an application. The access mechanism 336 can provide access to a native application that may be installed at the mobile computing device 100. Alternatively or additionally, the access mechanism 336 may provide access to a web application. The access mechanism 336 may include a uniform resource identifier (URI) that identifies a resource, and provides access to the resource. The access mechanism 336 may include an application resource identifier (ARI) that identifies a resource (e.g., a state) of an application, and provides access to the resource. The access mechanism 336 may include a link. For example, the access mechanism 336 may include a web uniform resource locator (URL) that links to a webpage, or an application URL that links to an application state.

The user information data store 340 stores user records 342 that correspond with different users. A user record 342 may include a user record ID 344, a user ID 102, user preferences 350, and a search history 360. The user record ID 344 may include a string that identifies the user record 342. The user ID 102 may include a string that identifies the corresponding user for the user record 342. The user ID 102 may include an email address, a phone number, a user name, etc. The user preferences 350 may specify things (e.g., food items, retail stores, websites, etc.) that the user prefers. For example, the user preferences 350 may include food preferences 352, shopping preferences 354, travel preferences 356, etc. The card server 300 may explicitly receive the user preferences 350 from the user. Alternatively, the card server 300 may determine the user preferences 350 based on the search history 360, a browsing history, and/or a shopping history associated with the user.

The food preferences 352 may include a preferred food item 352-1, an average food price 352-3, and/or a maximum food price 352-3. The preferred food item 352-1 may include a food ingredient (e.g., avocado), a prepared dish (e.g., curry), and/or a cuisine (e.g., Mexican food). The card server 300 may determine the preferred food item 352-1 based on the search history 360. For example, if a threshold number of search queries 122 in the search history 360 specify a particular food item, then the card server 300 may set that particular food item as the preferred food item 352-1. Alternatively, the card server 300 may determine the preferred food item 352-1 based on food that the user previously purchased (e.g., through a food-ordering application such as the EAT24® application). Similarly, the card server 300 can determine the average food price 352-2 and/or the maximum food price 352-3 based on the prices of food that the user previously purchased. In some examples, the user may have previously indicated the preferred food item 352-1 (e.g., via a graphical user interface (GUI)).

The shopping preferences 354 may include a preferred store 354-1, a preferred site 354-2, an average sale price 354-3, and/or maximum sale price 354-4. The preferred store 354-1 may specify one or more brick-and-mortar stores where the user predominantly shops (e.g., the Macy's® store). The preferred site 354-2 may specify one or more retail websites that the user predominantly utilizes for shopping (e.g., the Amazon.com® website). The average sale price 354-3 may include an average price that the user previously paid for things that the user purchased. The maximum sale price 354-4 may indicate the maximum price that the user previously paid for things that the user purchased. The card server 300 may explicitly receive the shopping preferences 354 from the user. Alternatively, the card server 300 may determine the shopping preferences 354 based on previous purchases that the user made (e.g., through a virtual wallet application such as the Google Wallet® application, the Android Pay® application, or the Apple Pay® service). The average sale price 354-3 may include average sale prices for different types of times (e.g., a first average sale price 354-3 for food, a second average sale price 354-3 for clothes, etc.). In some example, the shopping preferences 354 may include a preferred brand, a preferred shopping category (e.g., electronics), and/or a preferred product (e.g., shoes).

The travel preferences 356 may include one or more preferred destinations 356-1, and/or a preferred travel time 356-2. The preferred destinations 356-1 may include destinations that the user previously visited. Specifically, the preferred destinations 356-1 may include a destination that the user has repeatedly visited. The preferred destinations 356-1 may include destinations that are similar to destinations that the user has previously visited. The card server 300 may determine the preferred destinations 356-1 and/or the preferred travel time 356-2 based on a travel history. The travel history may be stored in a travel-related application such as the HOTELS.COM® application. In some implementations, the card server 300 may determine the preferred destinations 356-1 and/or the preferred travel time 356-2 based on the search history 360. For example, if more than a threshold number of search queries 122 in the search history 122 refer to a particular destination, then the card server 300 may set that particular destination as the preferred travel destination 356-1.

The search history 360 includes search queries 122 that the card server 300 receives from the user. A search query 122 may be associated with a query category 124. The card server 300 may categorize a search query 122 upon receiving the search query 122. The query categories 124 may indicate whether a particular search query 122 includes search terms that refer to a food item, a retail store, a travel destination, etc. The card server 300 may utilize a variety of techniques to categorize the search queries 122. For example, the card server 300 may include a data structure (e.g., a look-up table, an index, etc.) that maps keywords to query categories 124. The card server 300 can query that data structure with the search terms of a search query 122, and receive the query category 124 in return.

The ad keywords store 370 may include a list of advertised keywords. Each keyword may be associated with a bid price. The advertised keywords may be associated with different categories. For example, an advertised keyword that refers to a food item may be categorized as a "food item". In this example, the advertised keyword may include "salad", and the ad keywords store 370 may store this advertised keyword as following: keyword="salad"; category="food item"; bid price="$0.50". The ad keywords store 370 may include a database, a look-up table, an index (e.g., an inverted index). The ad keywords store 370 may include a mapping mechanism (e.g., look-up table, an index, an inverted index, etc.) that maps the categories to the keywords.

The processing device 380 may include a collection of one or more computing processors that execute computer readable instructions. The computing processors of the processing device 380 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 380 may execute computer-readable instructions that correspond with a card record selector 382, a bias parameter determiner 384, a display order determiner 386, and/or a card object generator 388.

The card record selector 382 selects one or more card records 322 from the card data store 320 based on the search query 122. In some implementations, the card data store 220 may include a data structure (e.g., an inverted index) that maps keywords to the card record IDs 324. In such implementations, the card record selector 382 can query the data structure with the search terms of the search query 122. In return, the card record selector 382 can receive the card record ID(s) 324 for the card record(s) 322 that correspond with the search query 122. The card records 322 that correspond with the card record IDs 324 that the card record selector 382 receives may be referred to as a consideration set of card records 322.

In some implementations, the card server 300 may generate an access mechanism for an application function based on the search query (e.g., instead of utilizing the card data store 320). In such implementations, the card server 300 may parse the search query 122 to generate a query-parse, and utilize a knowledge base to generate the access mechanism. The knowledge base may include information regarding various application functions. For example, the knowledge base may include access mechanism templates for various application functions. The access mechanism templates may be associated with various keywords. The knowledge base may include a mapping mechanism (e.g., an inverted index, a look-up table, etc.) that maps keywords to the access mechanism templates. The card server 300 can parse the search query 122 to generate query-parses. The card server 300 may query the mapping mechanism with the search terms of the search query 122 (e.g., with the query parses), and receive one or more access mechanism templates that may be relevant to the search query 122. The card server 300 can parameterize (e.g., populate) the access mechanism templates based on the search terms of the search query 122 (e.g., based on the query-parses).

In some implementations, the card record selector 382 may tokenize the search query 122 prior to selecting the card records 322 from the card data store 320. Tokenizing the search query 122 may refer to generating parsed tokens from the search terms of the search query 122. The card record selector 382 can use a tokenizer to tokenize the search query 122. The tokenizer can use various techniques to generate the tokens. In some examples, the tokenizer generates the tokens by splitting the characters of the search query 122 with a given delimiter (e.g., " "). The card server 300 can perform various other operations to the search query 122 prior to selecting the card records 322. For example, the card server 300 may perform stemming by reducing the words in the search query 122 to their stem word, or root word. The card server 300 can perform synonymization by identifying synonyms of search terms in the search query 122. The card server 300 may also identify misspelled words, and replace the misspelled words with the correct spelling. Some of the operations described herein may be referred to as 'cleaning' the search query 122.

In some implementations, the card record selector 382 can score the selected card records 322. Scoring the selected card record 322 may refer to generating a relevance score for the selected card record 322. The relevance score for the selected card record 322 may indicate how relevant the selected card record 322 is to the search query 122. The card record selector 382 can compute a set of scoring features for the selected card record 322, and determine a relevance score for the selected card record 322 based on the scoring features. The scoring features may include record scoring features, query scoring features, and/or record-query scoring features.

A record scoring feature may be associated with a card record 322. A record scoring feature may include data associated with an application state that corresponds with the card record 322. For example, a record scoring feature may include values from the one or more components 326. A record scoring feature may include parameters related to the application state that corresponds with the card record 322. A record scoring feature may include data that indicates a popularity of the corresponding application state. For example, a record scoring feature may indicate a number of times that the card record 322 has been utilized to generate an application card 130 at a mobile computing device 100. A record scoring feature may indicate a rating of the corresponding application state (e.g., a number of stars associated with the application state). A record scoring feature may include a Boolean value that indicates whether the card record 322 includes a list component 330. A record scoring feature may include the number of list components 330 in the card record 322.

A query scoring feature may be associated with the search query 122. A query scoring feature may include data associated with the search query 122. Example query scoring features may include a number of words in the search query 122, a popularity of the search query 122, and/or an expected frequency of the words in the search query 122. A record-query scoring feature may include data that may be generated based on data associated with the selected card record 322, and the search query 122. A record-query scoring feature may include parameters that indicate a number of matches between the terms of the search query 122, and the selected card record 322.

A record-query scoring feature may include data that may be generated based on data associated with the selected card record 322, and the search queries 122 in the search history 360. For example, the record-query scoring feature may include a Boolean value that indicates whether the any of the search queries 122 in the search history 360 match any of the items 332 in the list component 330. A record-query scoring feature may indicate the number of matches between the items 332 of a list component 330 and the search queries 122 in the search history 360. Other scoring features are also contemplated.

The card record selector 382 can score the card records 322 based on the scoring features. The card record selector 382 may include a machine learned model(s) (e.g., a supervised learning model). The machine learned model may be configured to receive the scoring features, and score the card records 322 based the scoring features. Specifically, the card record selector 382 may determine a feature vector that includes the record scoring feature(s), the query scoring feature(s), and/or the record-query scoring feature(s). The card record selector 382 may use the feature vector as an input for a machine-learned regression model to calculate a score for the card record 322. The machine-learned regression model may include a set of decision trees (e.g., gradient boosted decision trees). The machine-learned regression model may include a logistic probability formula. A machine learned task can be implemented as a semi-supervised learning task, where a portion of the training data is labeled with human-curated scores, and the remaining training data may be used without human-curated scores.

In some implementations, the card record selector 382 can filter out card records 322 based on the relevance scores for the card records 322. For example, the card record selector 382 can filter out a card record 322, if the relevance score for the card record 322 is below a threshold relevance score. In some implementations, the card record selector 382 may filter out all card records 322 except a threshold number of card records 322 with the highest relevance score. For example, the card record selector 382 may filter out all card records 322 except the card record 322 with the highest relevance score.

The bias parameters determiner 384 determines values for the bias parameters 334 that the list component(s) 330 of the selected card record(s) 322 can accept. In other words, the bias parameter determiner 384 can parameterize the bias parameters 334 that are associated with a list component 330. For example, if the list component 330 for a menu accepts a biased food item 334-1 as a bias parameter 334, then the bias parameter determiner 384 can determine a value for the biased food item 334-1. The bias parameter determiner 384 identifies a user record 342 that is associated with the card request 120. The bias parameter determiner 384 may retrieve a user ID 102 from the card request 120, and query the user information data store 340 with the retrieved user ID 102. In response to querying the user information data store 340 with the retrieved user ID 102, the bias parameter determiner 384 may receive a user record ID 344 for a user record 342 that is associated with the user ID 102 specified in the card request 120.

The bias parameter determiner 384 may identify the set of bias parameters 334 that are associated with a list component 330. In other words, the bias parameter determiner 384 can identify the set of bias parameters 334 that the list component 330 accepts. Upon identifying the bias parameters 334 that the list component 330 accepts, the bias parameter determiner 384 can determine values for the bias parameters 334 based on the information stored in the user record 342 associated with the card request 120. Specifically, the bias parameter determiner 384 may utilize the user preferences 350 and/or the search history 360 to determine the values for the bias parameters 334. For example, within the bias parameters 334, the bias parameter determiner 384 may set the value of the biased food item 334-1 equal to the preferred food item 352-1.

The user information data store 340 may include a mapping mechanism (e.g., a look-up table, an index, an inverted index, etc.) that maps bias parameters 334 to specific food preferences 352, shopping preferences 354, and/or travel preferences 356. The bias parameter determiner 384 can query the mapping mechanism to determine the values for the bias parameters 334. For example, if the bias parameter determiner 384 queries the mapping mechanism with "food item", the mapping mechanism may return the preferred food item 352-1 (e.g., "salad"). Similarly, if the bias parameter determiner 384 queries the mapping mechanism with "food price", the mapping mechanism may return the average food price 352-2 stored in the food preferences 352 (e.g., "$10"). Additionally or alternatively, the mapping mechanism can map the query categories 124 to their corresponding search queries 122. Hence, the values that the user information data store 340 returns may be search terms from the search queries 122 in the search history 360.

In some implementations, the bias parameter determiner 384 can determine the values for the bias parameter 334 based on the advertised keywords stored in the ad keywords store 370. The bias parameter determiner 384 can query the ad keywords store 370 with the bias parameter 334 (e.g., "food item"), and receive a value for the bias parameter 334. If the bias parameter determiner 384 receives multiple values for the bias parameter 334, then the bias parameter determiner 384 may select the value that is associated with the highest bid price.

The display order determiner 386 determines a display order 338 for the items 332 in the list component 330 based on the values of the bias parameters 334. Specifically, the display order determiner 386 can order (e.g., sort) the items 332 based on the values of the bias parameters 334. Items 332 that are the same as, or similar to the value of a bias parameter 334 can be ranked higher in the display order 338. By contrast, items 332 that are substantially different from the value of a bias parameter 334 can be ranked lower in the display order 338. Put another way, items 332 that match the value of a bias parameter 334 are displayed above items 332 that do not match the value of the bias parameter 334. For example, if the value for the biased food item 334-1 is "salad", then items 332 that include the word "salad" are displayed above items 332 that do not include the word "salad". Similarly, if the value for the biased food price 334-2 is "$10", then items 332 that cost approximately $10 are displayed above items 332 that cost significantly more than $10. The display order determiner 386 may utilize a variety of sorting algorithms to order the items 332. For example, the display order determiner 386 may utilize a simple sort (e.g., insertion sort, or selection sort), an efficient sort (e.g., merge sort, heapsort, or quicksort), a bubble sort, and/or a distribution sort.

The card object generator 388 generates the card object 390. The card object 390 includes the component(s) 326, and the list component(s) 330 from the selected card record(s) 322. For example, the card object 390 may include the items 332 from the list component(s) 330 of the selected card record(s) 322. For each list component 330 included in the card object 390, the card object generator 388 may include the display order 338 for the items 332 within the list component 330. The display order 388 can specify the order in which the items 332 can be displayed at the mobile computing device 100. The card object 390 may also include the access mechanism 336 from the selected card record 322. The card object generator 388 can instantiate a data container that represents the card object 390. The data container may include a JSON (JavaScript Object Notation) object, an XML (Extensible Markup Language) file, etc. Upon instantiating the data container, the card object generator 388 can write the items 332 of a list component 330, and the display order 338 for the items 332 to the data container. Upon generating the card object 390, the card object generator 388 can transmit the card object 390 to the mobile computing device 100 via the network communication device 305.

In some implementations, the card object generator 388 may reside on another computing system. In such implementations, the card server 300, and/or the mobile computing device 100 may utilize an application programming interface (API) to access the card object generator 388. The API may include a REST API that may accept the bias parameters 334, and return the card object 390.

In some implementations, the card object generator 388 may indicate the display order 338 via the access mechanism 336. For example, the card object generator 388 can include the values for the bias parameters 334 in the access mechanism 336, and the mobile computing device 100 can order the items 332 based on the values specified in the access mechanism 336. Put another way, the access mechanism 336 may include an access mechanism template that the card object generator 388 can parameterize with the values for bias parameters 334. In such implementations, when the mobile computing device 100 receives the parameterized access mechanism 336, the mobile computing device 100 can determine the display order 338 for the items 332 based on the values of the bias parameters 334 specified in the access mechanism 336. The mobile computing device 100 may utilize techniques similar to the techniques that the display order determiner 386 utilizes to order the items 332.

Figure 4:
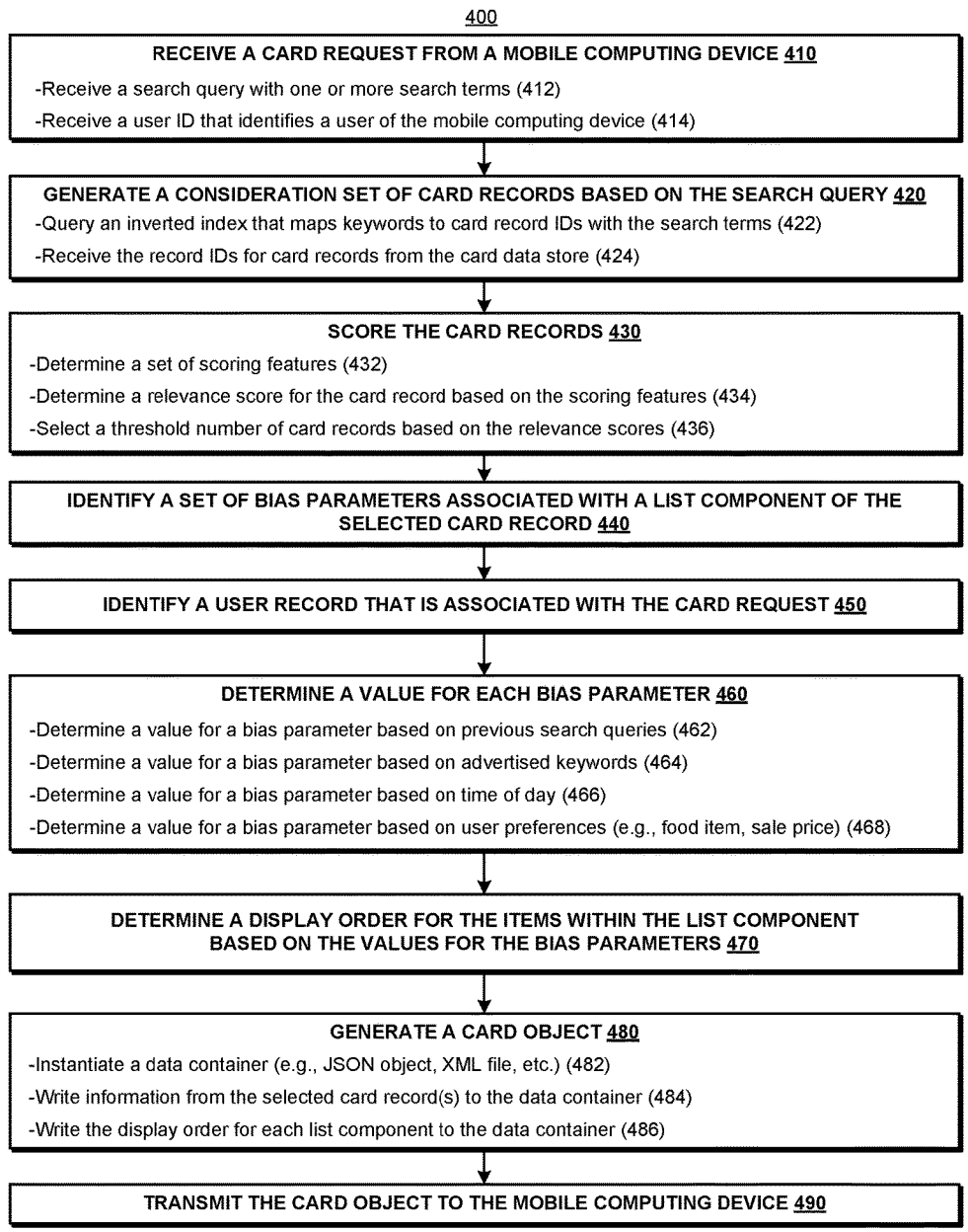
FIG. 4 is a block diagram of a method that the card server may execute to determine the display order for the items within a list component of an application card based on bias parameters.

FIG. 4 illustrates a method 400 for determining a display order for items within a list component of an application card. The method 400 can be implemented as a set of computer readable instructions that may be executed by a computing processor of a card server (e.g., the processing device 380 of the card server 300 shown in FIG. 3). Generally, the card server receives a card request from a mobile computing device (at 410). The card request includes a search query. At 420, the card server selects one or more card records from a card data store based on the search terms in the search query. The card server can score the selected card records (at 430). At 440, the card server identifies a set of bias parameters that are associated with a list component of the select card record. At 450, the card server identifies a user record that is associated with the card request. The card server determines values for the bias parameters based on the information included in the user record (at 460). At 470, the card server determines a display order for the items in the list component based on the values for the bias parameters. At 480, the card server generates a card object that includes the items from the list component, and indicates the display order for the items. At 490, the card server transmits the card object to the mobile computing device.

At 410, the card server receives a card request from a mobile computing device. Receiving the card request may include receiving a search query with one or more search terms (at 412). The search query in the card request may be referred to as a current search query. Receiving the card request may also include receiving a user ID that identifies a user of the mobile computing device that initiated the card request (at 414). The card request may include other information. For example, the card request may include contextual data such as sensor values (e.g., a location of the mobile computing device), application IDs that identify the applications that are installed at the mobile computing device, etc.

At 420, the card server generates a consideration set of card records from a card data store based on the search terms in the search query. In some implementations, the card data store may include a data structure that maps keywords to card record IDs that identify the card records. The data structure may include an index (e.g., an inverted index), a lookup table, etc. The card server can query the data structure with the search terms of the current search query (at 422). Upon querying the data structure with the current search query, the card server can receive the card record IDs for card records from the card data store (at 424). The card record IDs that the card server receives identify card records that may be relevant to the current search query. In some implementations, the card server may tokenize the current search query, and/or clean the search query (as described in relation to FIG. 3).

At 430, the card server scores the card records in the consideration set. Scoring the card records may include determining a set of scoring features (at 432). Upon determining the scoring features, the card server can determine a relevance score for the card record based on the scoring features (at 434). As described herein, determining the scoring features may include computing a query scoring feature, a record scoring feature, and/or a record-query scoring feature. Determining the relevance score may include utilizing a machine learned model that receives the scoring features for a card record as an input, and outputs the relevance score for the card record. In some implementations, the card server may select a particular number of card records from the consideration set based on the relevance scores of the card records in the consideration set (at 436). For example, the card server may select one, two, or three of the card records with the highest relevance scores.

At 440, the card server identifies a set of bias parameters that are associated with the list component of the selected card record. In some implementations, the items in the list component may be tagged with specific tags. For example, items on a menu may be tagged as "food item", etc. In such implementations, the card server can identify the set of bias parameters by identifying the tags associated with the items. Alternatively, the list component may include metadata that indicates the bias parameters that the list component accepts. The card server can read the metadata to identify the bias parameters.

At 450, the card server identifies a user record that is associated with the card request. The card server can retrieve a user ID from the card request. The card server can query a user information data store with the user ID, and receive a user record ID for a user record in return. The user record ID identifies a user record that corresponds with the user ID specified in the card request. Querying the user information data store may include querying a mapping mechanism that maps user IDs to user record IDs.

At 460, the card server determines values for the bias parameters that the list component may accept. The card server may utilize a variety of techniques to determine the values for the bias parameters. For example, the card server can determine the value for a bias parameter based on previous search queries that the card server received from the user (at 462). In some implementations, the card server can determine the value for a bias parameter based on advertised keywords stored in an ad keywords store (at 464). Alternatively or additionally, the card server can utilize time of day as a bias parameter (e.g., if the list component accepts time of day as a bias parameter) (at 466). In some implementations, the card server can determine the value for a bias parameter based on user preferences (at 468). In some implementations, the card server can utilize the day of the week, the month, the season, or other temporal properties as a bias parameter.

At 462, the card server may utilize previous search queries to determine the value for a bias parameter. The card server may store a search history that includes search queries that the card server received from the user in the past. The card server may have categorized the search queries. If a bias parameter matches any of the categories, then the card server can set the value for the bias parameter equal to a search query in the matching category. For example, if a bias parameter accepts a food item, then the card server can set the value for the food item equal to a food item that appears most frequently in the previous search queries. In some examples, the card server may select the food item that appeared most recently in the previous search queries. Similarly, if a bias parameter accepts an actor name, then the card server can set the value for the actor name equal to an actor name specified in a previous search query (e.g., the last search query).

At 464, the card server may utilize advertised keywords to determine the value for a bias parameter. The card server may store a list of advertised keywords. The advertised keywords may be categorized into various ad categories (e.g., a food item category, a retail store category, etc.). Moreover, each advertised keyword may be associated with a bid price. If a bias parameter matches any of the ad categories, then the card server can select the advertised keyword with the highest bid price from the matching ad category. For example, if a bias parameter can accept advertised keywords from the food item category, then the card server can select the advertised keyword that is associated with the highest bid price in the food item category.

At 466, the card server may utilize time of day, and/or day of the week as a bias parameter. If the list component accepts time of day and/or day of the week as a bias parameter, then the card server can select a time and/or a day as the value for the bias parameter. In some implementations, the card server may select the current time, and/or the current day as the values for the bias parameter. In some implementations, the card server may select a time of day that is not the current time, and/or a day of the week that is not the current day. In such implementations, the card server may select a time, and/or a day specified in the previous search queries and/or the current search query. Alternatively or additionally, the card server may select a preferred time, and/or a preferred day from the user preferences specified in the user record.

The user preferences may include different preferred times and/or preferred days for different things (e.g., activities). For example, the user preferences may include a first preferred time, and/or a first preferred day for eating at restaurants. In this example, the user preferences may include a second preferred time, and/or a second preferred day for shopping at stores. If the card record relates to a restaurant, then the card server may select the first preferred time, and/or the first preferred day. If the card record relates to a product that is sold at a store, then the card server may select the second preferred time, and/or the second preferred day.

At 468, the card server selects a value for a bias parameter based on user preferences associated with the card request. The card server may include a user information data store that stores user records for various users. Each user record may include a set of user preferences. The user information data store may include a data structure (e.g., an inverted index, a lookup table, etc.) that maps bias parameters to specific user preferences stored in a user record for the user. The card server can query the data structure with the bias parameters associated with the list component, and receive the appropriate user preferences in return. For example, the card server can query the data structure with "food item", and receive a preferred food item stored in the user preferences. As described herein, the card server may have received the user preferences from the user, or the card server may determine the user preferences (e.g., based on the search history, the browsing history, etc.).

At 470, the card server determines a display order for the items within the list component. The card server determines the display order based on the values for the bias parameters that the card server determined at 460. Determining the display order may include sorting the items based on the values for the bias parameters. Items that are associated with the value of a bias parameter may be displayed above items that are not associated with the value. Put another way, items that are the same as (e.g., equal to) the value of a bias parameter are displayed above items that are different (e.g., not equal to) from the value of the bias parameter. In some implementations, the card server may utilize a sorting algorithm to order the items.

At 480, the card server generates a card object. Generating the card object may include instantiating a data container that represents the card object (at 482). The data container may include a JSON object, an XML file, etc. The card server can write information from the selected card record into the data container (at 484). The information may include the components, the items within the list components, and the access mechanism. At 486, the card server writes the display order for the items of the list component into the data container. At 490, the card server transmits the card object to the mobile computing device. In some implementations, generating the card object may include parameterizing an access mechanism template with the values for the bias parameters. In such implementations, transmitting the card object may refer to transmitting the parameterized access mechanism template.

In some implementations, a list component may be associated with a primary bias parameter, and a secondary bias parameter. In such implementations, the card server may first determine the display order for the items based on the primary bias parameter. Upon determining the display order based on the primary bias parameter, the card server can modify the display order based on the secondary bias parameter. The card server may modify the display order based on the secondary bias parameter such that the display order is still compliant with the primary bias parameter. For example, a list component for a menu may accept a food item as a primary bias parameter, and an average food price as a secondary bias parameter. As illustrated in FIG. 2B, the card server may determine the biased food item to be "salad", and the biased food price to be $10. In this example, the card server can order the food items such that all salads appear at the top. Moreover, salads that cost approximately $10 are displayed above salads that cost more than $10.

In some implementations, the mobile computing device 100 may determine the display order 338 for the items 332 in a list component 330. In such implementations, the mobile computing device 100 can determine the bias parameters 334, and utilize the bias parameters 334 to determine the display order 338 for the items 332. The mobile computing device 100 may utilize techniques that are similar to the techniques described in relation to FIGS. 3 and 4. For example, the mobile computing device 100 may perform the operations performed by the bias parameter determiner 384, and the display order determiner 386 shown in FIG. 3. Similarly, the mobile computing device 100 may execute at least portions of the method 400 shown in FIG. 4. For example, the mobile computing device 100 may execute the blocks 440-470 shown in FIG. 4.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., LCD (liquid crystal display) monitor, or touch screen for displaying information to the user and optionally a keyboard and a pointing device, e.g., a mouse, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A card server comprising:
a network communication device;
a storage device that stores:
a user information data store that stores user records, each user record stores a user identifier (ID), user preferences, and a search history;
a card data store that stores card records, each card record comprises one or more list components, each list component comprises a plurality of items, at least one of the items is associated with one or more bias parameters; and
a processing device that executes computer-readable instructions that, when executed by the processing device, cause the processing device to:
receive a card request from a mobile computing device, the card request comprises a search query with one or more search terms, and a user ID that identifies a user of the mobile computing device;
generate a consideration set of card records based on the search terms in the search query;
determine a relevance score for each card record in the consideration set;
select a card record from the consideration set based on the relevance scores for the card records in the consideration set;
identify a set of bias parameters associated with a list component of the selected card record;
identify a user record from the user information data store that is associated with the card request;
determine a value for each bias parameter in the set of bias parameters based on the user information stored in the user record associated with the card request;
determine a display order for the items in the list component based on the values for the set of bias parameters;
generate a card object that includes the items of the list component, and indicates the display order for the items; and
transmit the card object to the mobile computing device.

2. The card server of claim 1, wherein identifying the set of bias parameters associated with the list component comprises identifying the bias parameters associated with the items within the list component.

3. The card server of claim 1, wherein determining the value for each of the bias parameters comprises:
querying the user information data store with a bias parameter of each of the bias parameters; and
receiving the value for the bias parameter from the user information data store.

4. The card server of claim 3, wherein querying the user information data store comprises querying a mapping mechanism that maps bias parameters to user preferences and/or search terms in the search history.

5. The card server of claim 3,
wherein the bias parameter accepts a food item, and
wherein receiving the value for the bias parameter comprises receiving a name of a preferred food item stored in the user preferences, one of receiving the name of a food item specified in a previous search query.

6. The card server of claim 3,
wherein the bias parameter accepts an actor name, and
wherein receiving the value for the bias parameter comprises receiving an actor name specified in a previous search query.

7. The card server of claim 3,
wherein the bias parameter accepts a day of the week, and
wherein receiving the value for the bias parameter comprises one of receiving a preferred day of the week stored in the user preferences, or receiving a day of the week indicated by the search history.

8. The card server of claim 1,
wherein determining the display order for the items comprises ordering items based on their association with the value of the bias parameter, and
wherein items that are associated with the value of the bias parameter are ranked higher than items that are not associated with the value of the bias parameter.

9. The card server of claim 1,
wherein the list component comprises a menu, and the items comprise food items on the menu,
wherein the value of the bias parameter comprises a particular food item, and
wherein determining the display order comprises ordering the food items on the menu based on their similarity with the particular food item.

10. The card server of claim 1, wherein generating the consideration set of card records comprises:
querying the card data store with the search terms of the search query; and
receiving card record IDs that identify card records, from the card data store, that are associated with the search terms of the search query.

11. The card server of claim 1, wherein determining the relevance score comprises:
determining a set of scoring features for the card record based on one of the search terms in the search query, or the information stored in the card record; and
determining the relevance score for the card record based on the set of scoring features.

12. The card server of claim 1, wherein selecting the card record from the consideration set comprises selecting the card record with the highest relevance score among the card records in the consideration set.

13. The card server of claim 1, wherein identifying the set of bias parameters associated with the list component comprises identifying bias parameters that the card server can utilize to order the items within the list component.

14. A computer-implemented method comprising:
storing, at a storage device of a card server, a user information data store that stores user records, each user record stores a user identifier (ID), user preferences, and a search history;
storing, at the storage device, a card data store that stores card records, each card record comprises one or more list components, each list component comprises a plurality of items, at least one of the items is associated with one or more bias parameters;
receiving, via a network communication device of the card server, a card request from a mobile computing device, the card request comprises a search query with one or more search terms, and a user ID that identifies a user of the mobile computing device;

generating, by a processing device of the card server, a consideration set of card records based on the search terms in the search query;

determining, at the processing device, a relevance score for each card record in the consideration set;

selecting, by the processing device, a card record from the consideration set based on the relevance scores for the card records in the consideration set;

identifying, by the processing device, a set of bias parameters associated with a list component of the selected card record;

identifying, by the processing device, a user record from the user information data store that is associated with the card request;

determining, at the processing device, a value for at least one bias parameter in the set of bias parameters based on the user information stored in the user record associated with the card request;

determining, by the processing device, a display order for the items in the list component based on the values for the set of bias parameters;

generating, at the processing device, a card object that includes the items of the list component, and indicates the display order for the items; and transmitting, via the network communication device, the card object to the mobile computing device.

15. The computer-implemented method of claim 14, wherein identifying the set of bias parameters associated with the list component comprises identifying the bias parameters associated with the items within the list component.

16. The computer-implemented method of claim 14, wherein determining the value for each of the bias parameters comprises:

querying the user information data store with a bias parameter of each of the bias parameters; and receiving the value for the bias parameter from the user information data store.

17. The computer-implemented method of claim 16, wherein querying the user information data store comprises querying a mapping mechanism that maps bias parameters to user preferences and/or search terms in the search history.

18. A computer program product encoded on a non-transitory computer readable storage medium comprising instructions that when executed by a processing device, of a card server, cause the processing device to perform operations comprising:

storing, at a storage device of the card server, a user information data store that stores user records, each user record stores a user identifier (ID), user preferences, and a search history;

storing, at the storage device, a card data store that stores card records, each card record comprises one or more list components, each list component comprises a plurality of items, at least one of the items is associated with one or more bias parameters;

receiving, via a network communication device of the card server, a card request from a mobile computing device, the card request comprises a search query with one or more search terms, and a user ID that identifies a user of the mobile computing device;

generating a consideration set of card records based on the search terms in the search query;

determining a relevance score for each card record in the consideration set;

selecting a card record from the consideration set based on the relevance scores for the card records in the consideration set;

identifying a set of bias parameters associated with a list component of the selected card record;

identifying a user record from the user information data store that is associated with the card request;

determining a value for at least one bias parameter in the set of bias parameters based on the user information stored in the user record associated with the card request;

determining a display order for the items in the list component based on the values for the set of bias parameters;

generating a card object that includes the items of the list component, and indicates the display order for the items; and transmitting, via the network communication device, the card object to the mobile computing device.

19. The computer program product of claim 18, wherein determining the value for the bias parameter comprises:

querying the user information data store with the bias parameter; and receiving the value for the bias parameter from the user information data store.

20. The computer program product of claim 19, wherein the bias parameter accepts a food item, and wherein receiving the value for the bias parameter comprises one of: receiving a name of a preferred food item stored in the user preferences, or receiving the name of a food item specified in a previous search query.

* * * * *